United States Patent
Elmedyb et al.

(10) Patent No.: US 8,477,952 B2
(45) Date of Patent: Jul. 2, 2013

(54) AUDIO SYSTEM WITH FEEDBACK DETECTION MEANS

(75) Inventors: Thomas Bo Elmedyb, Smorum (DK); Johan Hellgren, Linköping (SE)

(73) Assignee: Oticon A/S, Smorum (DK)

(*) Notice: Subject to any disclaimer, the term of this patent is extended or adjusted under 35 U.S.C. 154(b) by 301 days.

(21) Appl. No.: 13/042,234

(22) Filed: Mar. 7, 2011

(65) Prior Publication Data
US 2011/0176685 A1  Jul. 21, 2011

Related U.S. Application Data

(63) Continuation-in-part of application No. 11/409,991, filed on Apr. 25, 2006, now Pat. No. 7,925,031.

(30) Foreign Application Priority Data

Apr. 27, 2005 (EP) .................................... 05103454

(51) Int. Cl.
*H04R 5/00* (2006.01)
*H04R 25/00* (2006.01)
*H04B 15/00* (2006.01)

(52) U.S. Cl.
USPC .............. 381/23.1; 381/312; 381/83; 381/93; 381/95; 381/96; 381/121; 381/318

(58) Field of Classification Search
USPC ................ 381/23.1, 312, 83, 93, 95, 96, 121, 381/318
See application file for complete search history.

(56) References Cited

U.S. PATENT DOCUMENTS

| 4,905,290 A | 2/1990 | Yaoita |
| 2005/0047620 A1 | 3/2005 | Fretz |
| 2005/0226447 A1* | 10/2005 | Miller, III ..................... 381/318 |

FOREIGN PATENT DOCUMENTS

| DE | 197 48 079 A1 | 5/1999 |
| WO | WO 2004/105429 A1 | 12/2004 |
| WO | WO 2004/105430 A1 | 12/2004 |

* cited by examiner

*Primary Examiner* — Vivian Chin
*Assistant Examiner* — Paul Kim
(74) *Attorney, Agent, or Firm* — Birch, Stewart, Kolasch & Birch, LLP

(57) ABSTRACT

The invention concerns in a first aspect an audio system comprising a microphone, audio signal processing means, an output transducer and means for detecting a possible feedback tone and the corresponding frequency of the feedback tone in the audio system between the output transducer and the microphone. According to the invention means for counteracting feedback are provided. Further, means are provided for changing the phase of the audio signal at a given frequency. In a further aspect, a binaural hearing aid system comprising first and second hearing instruments according to the first aspect, each hearing instrument comprising transceiver circuitry allowing an exchange of signals between the two hearing instruments, and wherein the binaural hearing aid system is adapted to provide that a phase change introduced in the first audio signal by a controller of the first hearing instrument is or can be introduced in the second audio signal of the second hearing instrument via said transceiver circuitry.

20 Claims, 3 Drawing Sheets

AUDIO SYSTEM WITH FEEDBACK DETECTION MEANS

This application is a Continuation-In-Part of application Ser. No. 11/409,991 filed on Apr. 25, 2006, now Allowed on Dec. 8, 2011, the entire contents of which are hereby incorporated by reference and for which priority is claimed under 35 U.S.C. §120.

AREA OF THE INVENTION

The invention regards an audio system comprising a microphone, an audio signal processing means and an output transducer where the signal processing means comprises a detector for detecting the state of feedback in the audio system between the output transducer and the microphone. The disclosure further relates to a binaural hearing aid system comprising first and second hearing instruments.

BACKGROUND OF THE INVENTION

Feedback usually generates a loud howling sound in the output transducer. Detectors which may detect the presence of feed back are used in order to control the development of feed back in feedback cancellation systems where the detection may be used to control the adaptation, e.g. increase adaptation speed at the presence of howl. It is also used in hearing aids without feedback cancellation system as an "online feedback manager". The gain is then reduced at the frequency where howl is detected. The feedback is usually a rather narrow-band and loud signal, and it is not difficult to arrange a detector for such a signal in the signal path, however should a similar signal occur in the environment the detector will react to such a signal as well as to the real feedback signal. The problem to be solved by the invention is to distinguish tones caused by feedback from environmental sounds like tones, e.g. flute or other sounds with a high content of pure tones.

Patent application PCT/2004/000701 describes a method to detect howl that comprises analysis of the phase of the signal in the frequency domain. Successive windows of the input signal are then converted into frequency bands in the frequency domain. The change of phase of successive windows is then compared and if it is constant it is assumed to be caused by howl. The present invention differs from the application PCT/2004/000701 as the present invention modifies the phase of the forward path of the hearing aid and looks for changes in the frequency of the howl that can be expected if the howl is caused by feedback.

Patent application PCT/2004/000702 describes a method to suppress feedback that involves modification of the phase of the forward path. The phase is then modified in a random pattern, in opposite to the present invention that uses a predefined change of the phase. Further, the present invention is a method to detect howl and not to suppress feedback as application PCT/2004/000702.

SUMMARY OF THE INVENTION

The invention provides in a first aspect an audio system having a microphone, audio signal processing means, an output transducer and means for detecting a possible feedback tone and the corresponding frequency of the feedback tone in the audio system between the output transducer and the microphone. Also means for counteracting feedback are provided. According to the invention means are provided for changing the phase of the audio signal at a given frequency. Such a change in phase allows the audio system to detect whether the detected tone is caused by feedback or comes from the outside environment. Thus it becomes possible to more efficiently control the feedback cancellation system.

Preferably the audio system of the invention comprises a controller whereby the phase of the audio signal at a frequency is changed whenever the means for detecting a possible feedback in the audio system indicates possible feedback at this frequency and also a comparing unit is provided wherein the frequency of the detected possible feedback tone before and after effecting the change of the phase of the audio signal are compared. If the frequency of the detected possible feedback is not affected by the shift in phase, it is not a feedback tone, but has an origin outside the device. If the controlled change of the phase of the audio signal results in a change in frequency this change is detectable in the comparing unit and will be an indication that feedback is present at this frequency. Hereafter anti-feedback measurements may be turned on or speeded up in order to counteract the feedback.

It has been realized that when a change of phase of an audio signal in a hearing instrument at frequencies below a threshold frequency $f_{th}$ is introduced, a distinct effect is perceived by the user. This can be in a hearing instrument of a monaural hearing aid system or in one of the two hearing instruments of a binaural hearing aid system. In a binaural hearing aid system, such perceptive effect may be compensated for. Hence, in a second aspect, a binaural hearing aid system comprising first and second hearing instruments according to the first aspect of the present disclosure is provided. Each hearing instrument comprises transceiver circuitry allowing an exchange of signals between the two hearing instruments. The binaural hearing aid system is adapted to provide that a phase change introduced in the first audio signal by a controller of the first hearing instrument is or can be introduced in the second audio signal of the second hearing instrument via said transceiver circuitry.

Specifically, a binaural hearing aid system comprising first and second hearing instruments adapted for being worn at or in left and right ears of a user is provided. The first and second hearing instruments each comprises

- a microphone for capturing first and second audio signals, respectively,
- an audio signal processor,
- an output transducer, and
- transceiver circuitry for establishing a wireless link allowing an exchange of signals between the two hearing instruments, the first hearing instrument further comprises

- a feedback tone detector for detecting a possible feedback tone and the corresponding frequency of the feedback tone between the output transducer and the microphone of the first hearing instrument,
- an adaptive feedback cancellation system,
- a controller for changing the phase of the first audio signal at a given frequency with a predefined amount when the feedback detector detects a possible feedback tone in the first hearing instrument at this frequency, and
- a comparing unit for comparing the frequency of the detected possible feedback tone before and after effecting the change of the phase of the first audio signal, wherein the binaural hearing aid system is adapted to provide that the phase change introduced in the first audio signal by the controller of the first hearing instrument is or can be introduced in the second audio signal of the second hearing instrument via said wireless link.

In an embodiment, the phase change introduced in the first audio signal by the controller of the first (or second) hearing instrument is only introduced in the second (or first) audio signal of the second (or first) hearing instrument via the wireless link, if the frequency of the detected possible feedback tone is below a first threshold frequency $f_{th1}$. This has the advantage that the difference between the current phase of the first and second audio signal at frequency(ies) where a phase change is introduced is unchanged (compared to before the phase change is introduced). Thereby a perceived effect of the phase change by a user wearing the hearing instruments can be minimized or avoided. In an embodiment, the first threshold frequency $f_{th1}$ is equal to 5 kHz, or 4 kHz, or 3 kHz, 2.5 kHz, or 2.2 kHz, or 2 kHz, or 1.5 kHz. In an embodiment, the first threshold frequency $f_{th1}$ is equal to the maximum frequency considered by the system (such that the phase change is always transferred to the opposite hearing instrument).

In an embodiment, a controller for changing the phase of the first audio signal at a given frequency with a predefined amount when the feedback detector detects a possible feedback tone in the first or second hearing instrument at this frequency is adapted to only change the phase, and if said frequency is larger than a second threshold frequency $f_{th2}$. In an embodiment, $f_{th2}$ is equal to 500 Hz, or 600 Hz or 700 Hz. This has the advantage of preventing the introduction of a phase change at very low frequencies, where the phase change is the most disturbing for a user, and where a feedback tone is NOT expected to occur.

In an embodiment, the binaural hearing aid system is adapted to provide that a difference in the introduced phase change in the first and second hearing instruments at a given time is as small as possible, such as below 10°, such as below 5°, such as below 2°, such as below 1°. This can preferably be achieved by adapting the rate by which the phase change is introduced in the two hearing instruments to the accuracy in time with which the phase change can be introduced in the two hearing instruments (degree of simultaneousness or synchronisity).

In an embodiment, the second hearing instrument further comprises
  a feedback tone detector for detecting a possible feedback tone and the corresponding frequency of the feedback tone between the output transducer and the microphone of the second hearing instrument,
  an adaptive feedback cancellation system,
  a controller for changing the phase of the first audio signal at a given frequency with a predefined amount whenever the feedback detector detects a possible feedback in the second hearing instrument at this frequency, and
  a comparing unit for comparing the frequency of the detected possible feedback tone before and after effecting the change of the phase of the second audio signal.

In an embodiment, the binaural hearing aid system is adapted to provide that the phase change introduced in the second audio signal by the controller of the second hearing instrument is or can be introduced in the first audio signal of the first hearing instrument via said wireless link.

In an embodiment, the binaural hearing aid system is adapted to provide that a hearing instrument wherein a possible feedback tone is detected is appointed a 'master device' and the opposite hearing instrument a 'slave device' for the duration of the procedure for tone detection and (possible) feedback verification.

In an embodiment of the invention an allpass filter is provided for changing the phase of the audio signal, preferably a second order all pass filter. The allpass filter will always have a flat amplitude response while the phase can be changed. This makes it an ideal choice as a phase shifter. It is located in the signal path and is a part of the loop that may be oscillating. The frequency of the howl will be given by the Nyquist criterion and accordingly oscillation will occur at a frequency where the phase of the loop is a multiple of 360 degrees. If the phase in the loop is changed the frequency of the howl will change, and the allpass filter with the changeable phase allows a fast and simple way of changing the phase without otherwise affecting the signal. If the tone is external the frequency will be independent of the phase. That is, no change of frequency will occur when the phase is changed. If the signal detected as howl changes frequency when the phase is changed, then an outside source of this signal can be excluded, and the countermeasures against feedback are turned on.

In an embodiment of the invention the all pass filter has a transfer function of the following general form:

$$H(z) = \frac{a_2 + a_1 z^{-1} + z^{-2}}{1 + a_1 z^{-1} + a_2 z^{-2}}$$

This filter is easy to implement and a minimum of parameters need be changed in order to achieve a change in phase of the signal over a broad range of frequencies.

Preferably means are provided for gradual change of the coefficients $a_1$ and $a_2$. This gradual change will cause a change in phase without causing serious audible artefacts.

The invention also comprises a method for detecting acoustic feedback in an audio system.

In a further aspect, a method for detecting acoustic feedback in a binaural hearing aid system comprising first and second hearing instruments is adapted for capturing first and second audio signals, respectively, is provided. In the first hearing instrument, the first audio signal is captured by a microphone, the signal is processed in an audio processor and served at an output transducer, and where possible feedback tones are detected along with the corresponding frequency of the possible feedback tone between the output transducer and the microphone of the first hearing instrument, wherein the phase of the audio signal served at the output transducer of the first hearing instrument is changed with a predefined amount upon the detection of a possible feedback tone, and where the frequency of the detected possible feedback tone before and after causing the change of the phase of the audio signal are compared, and wherein the phase change introduced in the first audio signal by the controller of the first hearing instrument is introduced in the second audio signal of the second hearing instrument, if the frequency of the detected possible feedback tone is below a first threshold frequency $f_{th1}$.

In an embodiment, the method comprises that the phase is changed until the phase at the suspected frequency has changed so much that the frequency change that will occur if the howl is caused by feedback can be expected to be detected. In an embodiment, the phase is changed 180 degrees at the frequency of the detected possible feedback tone. In an embodiment, the method comprises that—when the phase has been modified to the desired value—it is fixed while the occurrence and/or frequency of howl is analysed, and subsequently, optionally, changed back to the original value. In an embodiment, the method comprises that—when the controlled change of the phase of the audio signal results in a change in frequency detectable in the comparing unit and indicating that feedback is present at this frequency—anti-feedback measurements are turned on or speeded up in order to counteract the feedback.

In an embodiment, the method comprises that the first threshold frequency $f_{th1}$ is equal to 5 kHz, or 4 kHz, or 3 kHz, 2.5 kHz, or 2.2 kHz, or 2 kHz, or 1.5 kHz. In an embodiment, the first threshold frequency $f_{th1}$ is equal to the maximum frequency of the system (such that the phase change is always transferred to the opposite hearing instrument).

In an embodiment, the method comprises that the phase of the first audio signal at a given frequency is changed with a predefined amount when the feedback detector detects a possible feedback tone in the first or second hearing instrument at this frequency is adapted to only change the phase, and if said frequency is larger than a second threshold frequency $f_{th2}$. In an embodiment, $f_{th2}$ is equal to 500 Hz, or 600 Hz or 700 Hz.

In an embodiment, the method is adapted to provide that a difference in the introduced phase change in the first and second hearing instruments at a given time is as small as possible, such as below 10°, such as below 5°, such as below 2°, such as below 1°. In an embodiment, the rate by which the phase change is introduced in the two hearing instruments is adapted to the accuracy in time with which the phase change can be introduced in the two hearing instruments to minimize the difference in the introduced phase change between the two hearing instruments at a given time. In an embodiment, the method comprises that the time difference between the introduction of a phase change at a frequency of a detected possible feedback tone in the first hearing instrument and in the second hearing instrument is as small as possible, e.g. less than the duration of a predefined number of time samples, e.g. less than 5 ms, such as less than 2 ms, such as less than 1 ms, such as less than 0.5 ms.

In an embodiment, the method comprises that the introduction of the phase change is delayed in the first hearing instrument to minimize the time difference between the introduction of a phase change between the first and second hearing instrument.

DESCRIPTION OF A PREFERRED EMBODIMENT

Figure 1:
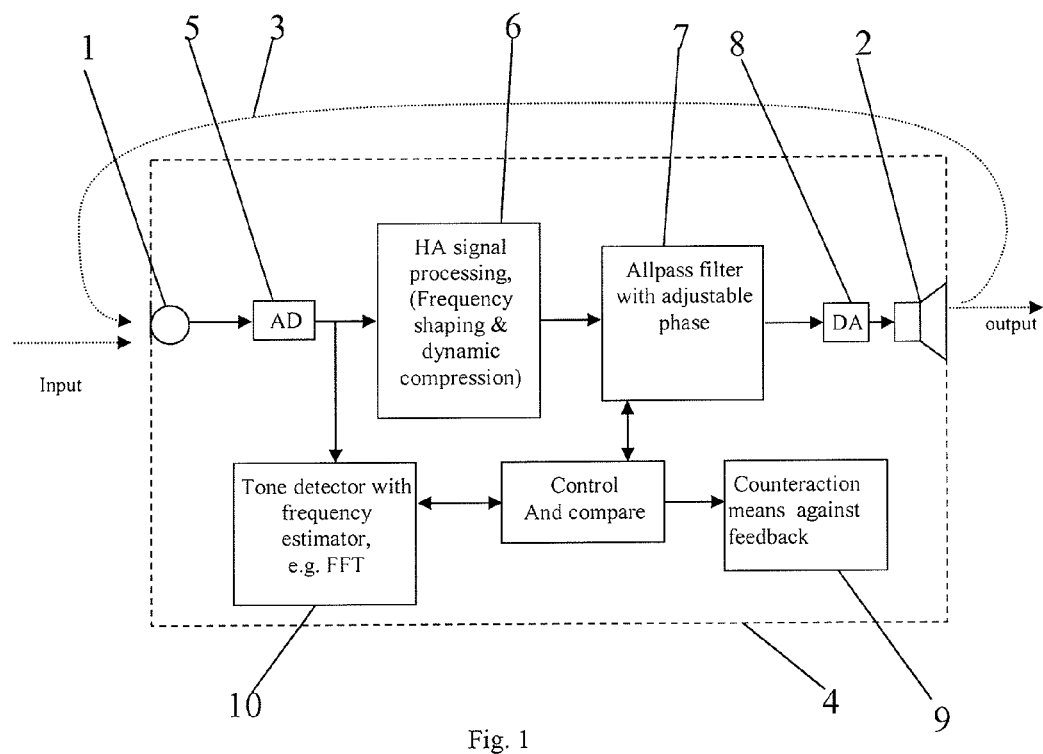
FIG. 1 shows a hearing aid with howl detector that uses allpass filter with adjustable phase to distinguish howl from other tones.

An example of a system according to the invention is shown in FIG. 1. In the example a hearing aid is displayed, but any audio device with a microphone 1, a signal processing means and an output transducer or loudspeaker 2, wherein an acoustic feedback path 3 is present may benefit from the invention. The hearing aid 4 in FIG. 1 further comprises an AD transformer 5, a signal shaping block 6, an allpass filter block 7, and a DA transformer 8. The delay, and thus the phase, in the loop comprising the components in the hearing aid 1, 5, 6, 7, 8, 2 and the acoustic feedback path 3 depends to a large extent on the signal processing in the hearing aid 4. In hearing aids a sample delay in the order of 100 samples (approximately 6 ms) in the loop is not un-common. Accordingly the frequencies where there is potential howl are separated by about 170 Hz. Changing the phase at the frequency of the howl by 180 degrees will cause the frequencies where howl may occur to shift by about 85 Hz. Shifting the phase by 180 degrees will give the greatest shift in howl frequency. If we shift phase more than that, the shift in frequency may be less.

If the processing within the audio processor allows the determination of frequency shifts smaller than 85 Hz the phase change of the suspected feedback tone may be chosen to a different value than 180 degrees. Setting the phase shift to a lower value than 180 degrees could provide other advantages as in the low frequency area the phase change effected on the output when applying the all pass filter to the processed sound may have side effects for the hearing aid user. One side effect is that the perceived directionality of the sound may change, which may be un-comfortable for the user.

A digital allpass filter can be generated with the following transfer function:

$$H(z) = \frac{a_N + a_{N-1}z^{-1} + K + a_1 z^{-N-1} + z^{-N}}{1 + a_1 z^{-1} + a_2 z^{-2} + K + a_N z^{-N}}$$

A second order allpass filter can be designed as follows:

$$H_1(z) = \frac{a_2 + a_1 z^{-1} + z^{-2}}{1 + a_1 z^{-1} + a_2 z^{-2}}$$

Figure 2:
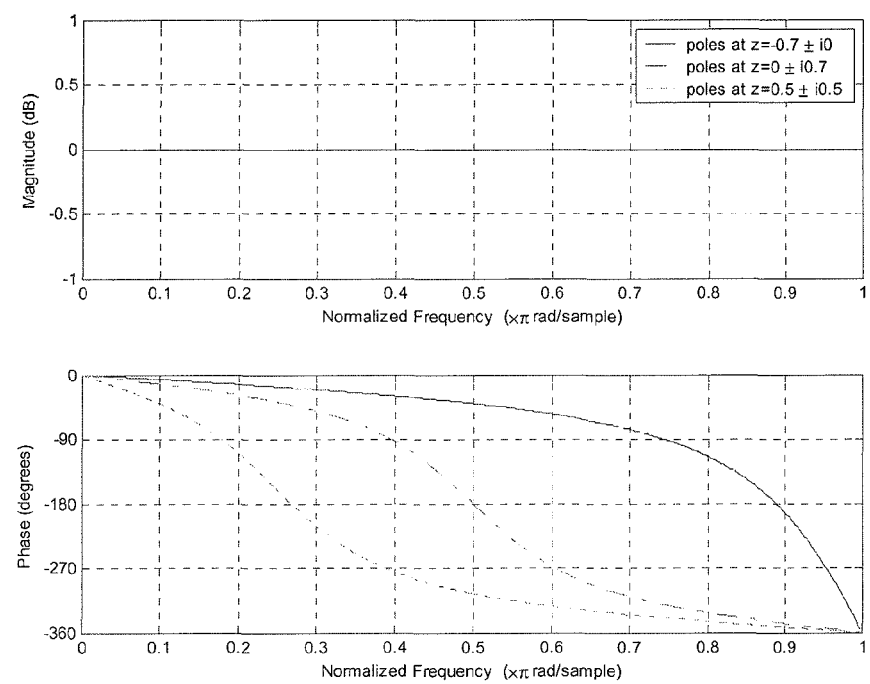
FIG. 2 is three examples of phase responses with three alternative settings of a second order allpass filter.

FIG. 2 shows the amplitude and phase response with three alternative settings of a second order allpass filter. Assume that the setting with poles at $z=-0.7\pm i0$ is used as a default setting. If a suspected howl occurs with a normalized frequency of 0.55 then it will be useful to move the poles to $z=0\pm i0.7$ as this gives a change of the phase response of about 180 degrees at this frequency. If the suspected howl instead have a normalized frequency of 0.29 then it is desirable to move the poles to $z=0.5\pm i0.5$, as this gives about 180 phase shift at this frequency. The coefficients that give the desired phase change at the frequency of interest are easily determined using common filter design tools. The poles and the $a_1$, $a_2$ coefficients are unambiguously interlinked by the $H_1(z)$ function. There may be multiple positions of the pole that give the same phase at the frequency of interest.

The design of the filter $H_1$ amounts to determine the value of the two coefficients $a_1$ and $a_2$ and here a broad range of changes in the phase frequency relationship is realizable, and it is also possible to provide all pass filters where the phase change in the frequency area below 1 kHz is very small, and thus avoid the previously mentioned problems of perceived directionality changes.

Other means for giving a phase shift of the signal at a frequency are available, like a more general digital filter, inversion of the signal or by changing the phase in the frequency domain. An allpass filter is in most cases a good choice as it can change the phase without changing the amplitude response.

Other filters that also give some change in the amplitude response when the phase response is changed could be used, but the change in amplitude response is usually not desired.

The allpass filter 7 could be combined with the filter 6 in the forward path that usually is used to shape the frequency response of the hearing aid. These two filters can be combined into a non-flat filter that can change the phase response without changing the amplitude response.

Inversion of the signal could be achieved by applying a gain that is gradually changing from +1 to −1. This will usually create more audible artefacts than the allpass filter.

An implementation in the frequency domain can be designed as follows: The time domain input signal is converted to the frequency domain by a transform, e.g. fast Fourier transform (FFT). The phase of the particular frequency band corresponding to a suspected feedback howl can then be gradually changed by applying a complex valued band gain with a fixed magnitude but with a gradually changing phase. The phase is changed until the phase at the suspected frequency has changed so much that the frequency change that will occur if the howl is caused by feedback can be expected to be detected. It can be useful to change the phase 180 degrees at the frequency of interest as it can be expected to give the greatest shift in howl frequency. When the phase has been modified to the desired value it is fixed while the occurrence and/or frequency of howl is analysed. Then it can be changed back to the original value. This signal processing can be combined with other types of processing in the frequency domain, e.g. frequency shaping and compression of dynamics. The inverse transform is used to convert the frequency domain signal back to the time domain. The implementation in the frequency domain allows for simultaneous tests of multiple frequencies with suspected howl.

A possible system could use an allpass filter with the displayed response as default. This response is maintained as long as howl is not suspected to be present. When a tone that may be howl is present and detected by the tone detector 10 the coefficients are gradually faded to coefficients that give a 180 degree phase shift at the suspected frequency. The frequencies of the suspected tone before and after the phase shift are then compared and if they have not changed the tone is most likely to have an origin outside the hearing aid and if the frequency has shifted, the tone is most likely to be caused by feedback. In this event a message is transmitted to the means 9 for counteracting the feedback, of the audio device to start up or improve the antifeedback measures.

Figure 3:
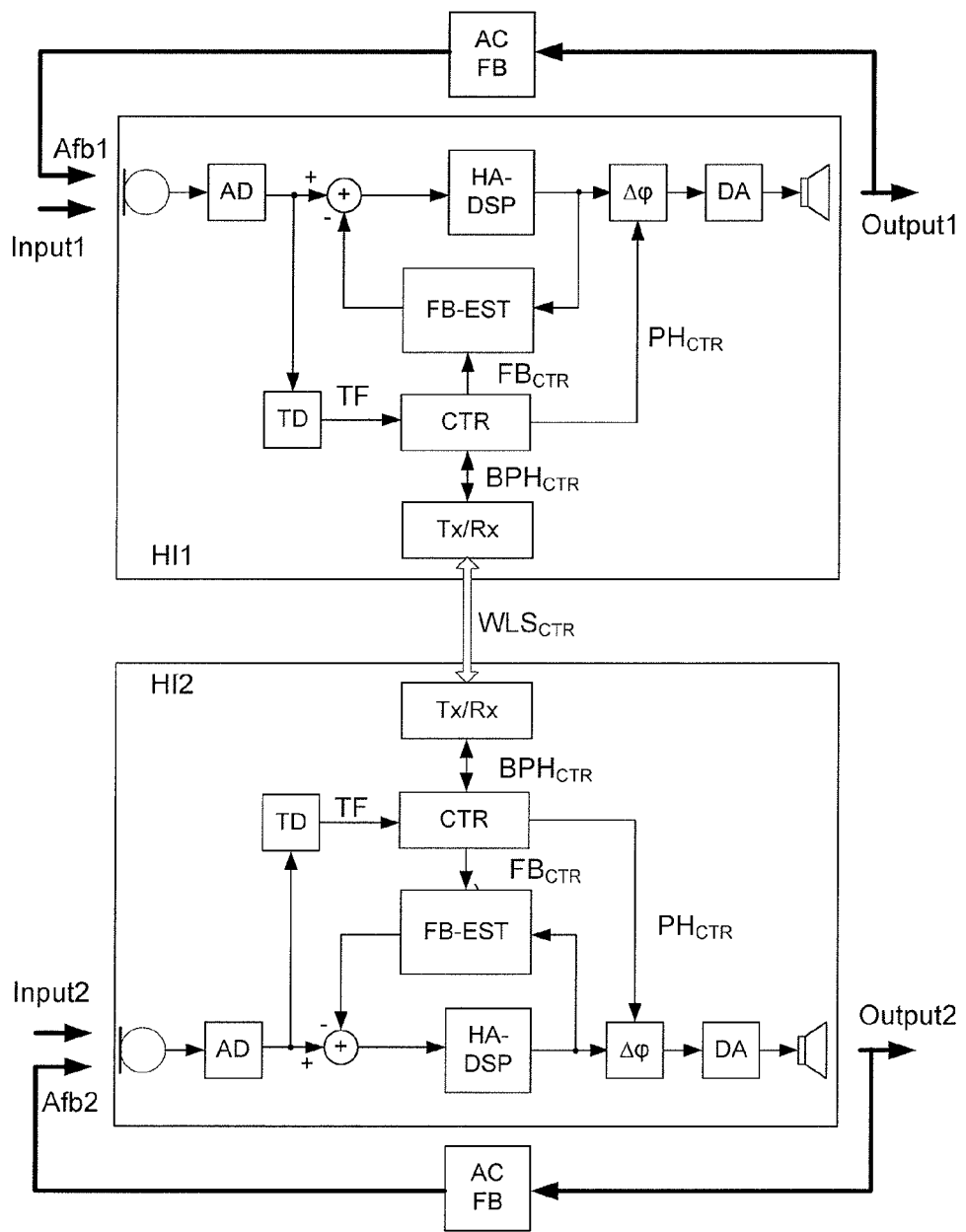
FIG. 3 shows a binaural hearing aid system comprising two hearing aids as exemplified in FIG. 1, the two hearing aids being further adapted to allow an exchange of signals between them.

FIG. 3 shows a binaural hearing aid system comprising two hearing aids as exemplified in FIG. 1 and described above, the two hearing aids being further adapted to allow an exchange of signals between them. The binaural hearing aid system comprises first (HI1) and second (HI2) hearing instruments, each comprising a transceiver unit (Tx/Rx) for establishing a wireless link $WLS_{CTR}$ for exchanging signals (e.g. control signals) between the first and second hearing instruments. The first and second hearing instruments of the embodiment of FIG. 3 are assumed to be functionally identical and comprising the normal basic elements of a modern hearing aid. Each hearing instrument comprises e.g. a microphone (or a microphone system) for picking up an input sound signal (comprising an input signal from the environment (Input 1, Input 2, respectively) and an acoustic feedback signal (AFB1, AFB2, respectively) from an output transducer of the hearing instrument in question). The microphone converts the input sound to an analogue electric input signal, which is sampled and digitized in an analogue to digital converter (AD). The digitized input signal is fed to sum unit ('+') where additionally an estimate of the acoustic feedback signal is subtracted from the digitized input signal to provide a feedback corrected input signal which is fed to a signal processing unit (HA-DSP), wherein various algorithms and functionality for improving the signal are applied (e.g. compression, noise reduction, etc., including applying a frequency dependent gain) to the (feedback compensated) input signal. The processed output signal from the signal processing unit is fed to a phase change unit ($\Delta\phi$) wherein a phase change can be applied to the signal from the signal processing unit. The applied phase change (which in the normal case where no tone is detected is zero) is controlled by an input signal $PH_{CTR}$ from control unit CTR. The output signal from the phase change unit is fed to a digital to analogue converter (DA) whose output is fed to a speaker for conversion of the electric output signal to an output sound (Output 1, Output 2, respectively). In an embodiment, the digital to analogue converter (DA) is omitted and the speaker is driven directly by a digital signal. The hearing instruments (HI1, HI2) of the embodiment of FIG. 3 each further comprises a feedback estimation unit (FB-EST) for estimating acoustic feedback and receiving an input signal from the output side of the forward path (here the processed output of the signal processing unit (HA-DSP)) and from the input side of the forward path (here the feedback corrected input signal). The feedback estimation unit (FB-EST) provides an output signal in the form of an estimate of the feedback path, e.g. from the speaker to the microphone (and possibly, as here, including the AD and DA converters and possibly other attached components, e.g., as here the, phase change unit ($\Delta\phi$). Each hearing instrument further comprises a tone detector (TD) for detecting a tone in the input signal (here in the digitized input signal) and determining its frequency. The frequency of the tone (and possibly its magnitude (and possibly it's phase)) (signal TF) is forwarded to control unit (CTR), wherein a decision to insert a phase change $\Delta\phi$ in the output signal at the frequency of a possible tone is taken. Control signals ($PH_{CTR}$ and $BPH_{CTR}$) initiating such phase change (e.g. for a predetermined time period) in the same hearing instrument (e.g. HI1) and in the contralateral hearing instrument (e.g. HI2), respectively, are forwarded from the control unit (CTR) to the phase change unit ($\Delta\phi$) and the transceiver unit (Tx/Rx), respectively (of HI1). Preferably, the (same) phase change $\Delta\phi$ is introduced substantially simultaneously in the two hearing instruments. The control signal $BPH_{CTR}$ forwarded to the transceiver unit (Tx/Rx) e.g. of the first hearing instrument (HI1) is transmitted via wireless link $WLS_{CTR}$ to the transceiver unit (Tx/Rx) of the second hearing instrument (HI2), where it is demodulated, extracted and fed to the control unit (CTR), and the phase change is initiated by control signal $PH_{CTR}$ fed to the phase change unit ($\Delta\phi$) of the second hearing instrument (HI2). In case a change of frequency of the tone detected by the tone detector from before to after the phase change was introduced is verified in the first hearing instrument (by comparing the frequency before (TF(before)) and after (TF(after)) the phase change in control unit CTR), it is concluded that the tone is due to feedback and a control signal ($FB_{CTR}$) is fed to the feedback estimation unit of the first hearing instrument to activate it and/or to increase its adaptation rate (e.g. by increasing a step size μ of the adaptation algorithm, e.g. an LMS algorithm). Subsequently or simultaneously, e.g. after a delay to allow the feedback estimation unit to provide an updated feedback estimate, the phase change is removed (adapted to its normal value $\Delta\phi=0$) in both hearing instruments using the same procedure as when the phase change was introduced. The action to reduce feedback is primarily relevant for the hearing instrument, where the feedback tone has been detected and verified. However, the same action may or may not be introduced in the feedback estimation unit of the second hearing instrument. In case the frequency of the detected tone in the first hearing instrument does NOT change, it is concluded that the tone is an external tone, and the phase change is removed (adapted to its normal value $\Delta\phi=0$) in both hearing instruments using the same procedure as when the phase change was introduced. The tone detection and thus the process of introducing (and removing) a phase change simultaneously in both hearing instruments of a binaural hearing aid system can be initiated from any of the first and second hearing instruments. Instead of (or in addition to)

changing the adaptation speed of a feedback estimation unit, a gain of the signal processing unit may be reduced in case a feedback tone is detected. In an embodiment, the phase change unit (Δφ) comprises an all pass filter, preferably a second order all pass filter.

In the embodiment of a binaural hearing aid system shown in FIG. 3, the two hearing instruments are functionally symmetric (identical) with respect to the feedback detection and subsequent action. This need not be the case however. In an embodiment, the feedback detection is only performed in the first hearing instrument (or managed by the first hearing instrument, the first hearing instrument being a master device and the second hearing instrument a slave device). In an embodiment, the wireless link $WLS_{CTR}$ is a one way link from the first to the second hearing instrument. In the embodiment of a binaural hearing aid system shown in FIG. 3, the two hearing instruments comprise means for counteracting feedback in the form of a feedback estimation unit (FB-EST), e.g. comprising an adaptive filter.

In an embodiment, the means for counteracting feedback is present in the form of a control signal from the control unit CTR to the signal processing unit that reduces gain at the frequency of a detected feedback tone (at least for the duration of feedback tone detection). Such gain reduction may be implemented in both hearing instruments or solely in the one where the feedback tone is detected. In an embodiment, a gain reduction as well as a feedback estimation (and cancellation) system are implemented in at least one of the hearing instruments. In addition or alternatively, any other means for counteracting feedback may be included in the first and/or second hearing instrument, e.g. frequency transposition, band substitution, etc.

The exchange of signals between hearing instruments of a binaural hearing aid system is e.g. discussed in U.S. Pat. No. 5,991,419 and in WO 99/43185 A1.

The invention claimed is:

1. A binaural hearing aid system comprising first and second hearing instruments adapted for being worn at or in left and right ears of a user,
   the first and second hearing instruments each comprising
      a microphone for capturing first and second audio signals, respectively,
      an audio signal processor,
      an output transducer, and
      transceiver circuitry for establishing a wireless link allowing an exchange of signals between the two hearing instruments,
   the first hearing instrument further comprising
      a feedback tone detector for detecting a possible feedback tone and the corresponding frequency of the feedback tone between the output transducer and the microphone of the first hearing instrument,
      an adaptive feedback cancellation system,
      a controller for changing the phase of the first audio signal at a given frequency with a predefined amount when the feedback detector detects a possible feedback tone in the first hearing instrument at this frequency, and
      a comparing unit for comparing the frequency of the detected possible feedback tone before and after effecting the change of the phase of the first audio signal,
   wherein the binaural hearing aid system is adapted to provide that the phase change introduced in the first audio signal by the controller of the first hearing instrument is introduced in the second audio signal of the second hearing instrument via said wireless link.

2. A binaural hearing aid system as claimed in claim 1, wherein the second hearing instrument further comprises
   a feedback tone detector for detecting a possible feedback tone and the corresponding frequency of the feedback tone between the output transducer and the microphone of the second hearing instrument,
   an adaptive feedback cancellation system,
   a controller for changing the phase of the second audio signal at a given frequency with a predefined amount when the feedback detector detects a possible feedback in the second hearing instrument at this frequency, and
   a comparing unit for comparing the frequency of the detected possible feedback tone before and after effecting the change of the phase of the second audio signal.

3. A binaural hearing aid system as claimed in claim 2, wherein the binaural hearing aid system is adapted to provide that the phase change introduced in the second audio signal by the controller of the second hearing instrument is introduced in the first audio signal in the first hearing instrument via said wireless link.

4. A binaural hearing aid system as claimed in claim 1, wherein the controller for changing the phase of the audio signal comprises an all pass filter, preferably a second order all pass filter.

5. A binaural hearing aid system as claimed in claim 4, wherein the all pass filter has a transfer function of the following general form:

$$H(z) = \frac{a_2 + a_1 z^{-1} + z^{-2}}{1 + a_1 z^{-1} + a_2 z^{-2}}.$$

6. A binaural hearing aid system as claimed in claim 5, wherein means are provided for gradual change of the coefficients $a_1$ and $a_2$.

7. A binaural hearing aid system as claimed in claim 1 wherein the predefined amount of phase change at a given frequency is 180 degrees.

8. A binaural hearing aid system as claimed in claim 1 comprising a time domain to frequency domain transformation unit.

9. A binaural hearing aid system as claimed in claim 1 wherein the controller is adapted to gradually change the phase of the particular frequency band corresponding to a suspected feedback howl by applying a complex valued frequency band gain with a fixed magnitude but with a gradually changing phase.

10. A method for detecting acoustic feedback in a binaural hearing aid system comprising first and second hearing instruments adapted for capturing first and second audio signals, respectively, the method comprising:
   capturing the first audio signal in the first hearing instrument by a microphone;
   processing the first audio signal in an audio processor, the processing including
      detecting possible feedback tones along with the corresponding suspected frequency of the possible feedback tone between the output transducer and the microphone of the first hearing instrument,
      changing the phase of the first audio signal served at the output transducer by a predefined amount upon the detection of a possible feedback tone, and
      comparing the frequency of the detected possible feedback tone before and after causing the change of the phase of the audio signal;

serving the processed first audio signal at an output transducer; and introducing the phase change introduced in the first audio signal by the controller of the first hearing instrument in the second audio signal of the second hearing instrument when the frequency of the detected possible feedback tone is below a first threshold frequency $f_{th1}$.

11. The method as claimed in claim 10 wherein the phase is changed until the phase at the suspected frequency has changed so much that the frequency change that will occur if the howl is caused by feedback can be expected to be detected.

12. The method as claimed in claim 10 wherein the phase is changed 180 degrees at the frequency of the detected possible feedback tone.

13. The method as claimed in claim 10 wherein, when the phase has been modified to the desired value, the phase is fixed while the occurrence and/or frequency of howl is analysed, and subsequently, optionally, changed back to the original value.

14. The method as claimed in claim 10 wherein, when the controlled change of the phase of the audio signal results in a change in frequency detectable in the comparing unit and indicating that feedback is present at this frequency, results in anti-feedback measurements being turned on or speeded up in order to counteract the feedback.

15. The method as claimed in claim 10 wherein the first threshold frequency $f_{th1}$ is 4 kHz.

16. The method as claimed in claim 10 wherein the phase of the first audio signal at a given frequency is changed with a predefined amount when the feedback detector detects a possible feedback tone in the first or second hearing instrument at this frequency is adapted to only change the phase, and if said frequency is larger than a second threshold frequency $f_{th2}$.

17. The method as claimed in claim 16 wherein the second threshold frequency $f_{th2}$ is 700 Hz.

18. The method as claimed in claim 10 wherein the rate by which the phase change is introduced in the two hearing instruments is adapted to the accuracy in time with which the phase change can be introduced in the two hearing instruments to minimize the difference in the introduced phase change between the two hearing instruments at a given time.

19. The method as claimed in claim 10 wherein the time difference between the introduction of a phase change at a frequency of a detected possible feedback tone in the first hearing instrument and in the second hearing instrument is less than 5 ms.

20. The method as claimed in claim 10 wherein the introduction of the phase change is delayed in the first hearing instrument to minimize the time difference between the introduction of a phase change between the first and second hearing instrument.

* * * * *